United States Patent
Pietschmann

(10) Patent No.: US 10,073,675 B2
(45) Date of Patent: *Sep. 11, 2018

(54) CONTROL UNIT FOR A MOTOR VEHICLE, PROGRAMMING UNIT, AND PROGRAMMING SYSTEM

(71) Applicant: Bayerische Motoren Werke Aktiengesellschaft, Munich (DE)

(72) Inventor: Ingolf Pietschmann, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,395

(22) Filed: Jan. 17, 2014

(65) Prior Publication Data

US 2014/0136016 A1   May 15, 2014

Related U.S. Application Data

(63) Continuation of application No. PCT/EP2012/063394, filed on Jul. 9, 2012.

(30) Foreign Application Priority Data

Jul. 19, 2011   (DE) .................. 10 2011 079 399

(51) Int. Cl.
*G06F 8/65*   (2018.01)
*G06F 7/00*   (2006.01)

(52) U.S. Cl.
CPC . *G06F 7/00* (2013.01); *G06F 8/65* (2013.01)

(58) Field of Classification Search
CPC ... G06F 9/445; G06F 7/00; G06F 8/65; G06F 6/60–6/77

(Continued)

(56) References Cited

U.S. PATENT DOCUMENTS 6,694,235 B2   2/2004   Akiyama
6,895,233 B2   5/2005   Chen et al.
(Continued)

FOREIGN PATENT DOCUMENTS

CN        1719782 A    1/2006
CN      101403345 A    4/2009
(Continued)

OTHER PUBLICATIONS

International Search Report (PCT/ISA/210) with English translation dated Aug. 31, 2012 (Seven (7) pages).

(Continued)

*Primary Examiner* — Genna M Mott
(74) *Attorney, Agent, or Firm* — Crowell & Moring LLP

(57) ABSTRACT

A control unit for a motor vehicle includes a central processing unit, which is configured to execute one or more control programs. The control unit has a communication interface, and a memory for storing the program data of respective control programs. The control unit evaluates a program data update request, provided at the communication interface, for a control program that is to be updated. The program data update request includes an address of an external data source, which is independent of the control unit and from which the respective current program data of the control program to be updated can be requested. The control unit outputs a program data request to the external data source, reads in the program data of the respective control programs, which are present at the communication interface in response to the program data request, and stores the program data in the program memory.

16 Claims, 1 Drawing Sheet

(58) Field of Classification Search
USPC .................................. 701/29.1–34.4, 1, 36
See application file for complete search history.

(56) References Cited

U.S. PATENT DOCUMENTS

| | | | |
|---|---|---|---|
| 7,594,017 | B1 | 9/2009 | DiValentino |
| 8,086,688 | B1* | 12/2011 | Bacastow ............. G06F 21/305 709/213 |
| 8,406,750 | B2 | 3/2013 | Sonnenrein et al. |
| 2004/0268118 | A1* | 12/2004 | Bazan Bejarano ..... H04L 63/08 713/151 |
| 2005/0055687 | A1* | 3/2005 | Mayer ....................... G06F 8/65 717/173 |
| 2009/0240391 | A1* | 9/2009 | Duddle ................ B60W 40/09 701/31.4 |
| 2009/0300595 | A1* | 12/2009 | Moran ...................... G06F 8/65 717/170 |
| 2010/0234008 | A1 | 9/2010 | Kumar |
| 2011/0093632 | A1* | 4/2011 | Aue ............................. 710/105 |
| 2011/0264844 | A1* | 10/2011 | Fischer .................... G06F 8/61 711/103 |
| 2011/0307336 | A1* | 12/2011 | Smirnov et al. ........... 705/14.62 |

FOREIGN PATENT DOCUMENTS

| | | | | |
|---|---|---|---|---|
| DE | 102 30 351 A1 | 1/2003 | | |
| DE | 102 25 784 A1 | 12/2003 | | |
| DE | 102 26 095 A1 | 12/2003 | | |
| DE | 10 2004 050 793 A1 | 4/2006 | | |
| DE | 10 2006 021 947 A1 | 11/2007 | | |
| DE | 10 2008 030 562 A1 | 12/2009 | | |
| DE | 102008052955 A1 * | 5/2010 | ............... | G06F 8/61 |
| DE | 10 2009 018 761 A1 | 10/2010 | | |
| DE | 102012009482 A1 * | 11/2013 | ............ | G06F 8/665 |
| FR | 2 837 946 A1 | 10/2003 | | |
| WO | WO 2010/124775 A1 * | 11/2010 | ............... | G06F 8/64 |
| WO | WO 2010/143910 A2 | 12/2010 | | |

OTHER PUBLICATIONS

German Search Report with English translation dated Jul. 12, 2012 (Ten (10) pages).
International Preliminary Report on Patentability (PCT/IB/373) dated Jan. 21, 2014 with Written Opinion (PCT/ISA/237) dated Jan. 21, 2014 (Nine (9) pages).
Chinese Office Action issued in Chinese counterpart application No. 201280035442.9 dated Feb. 15, 2016, with English translation (Nineteen (19) pages).

* cited by examiner

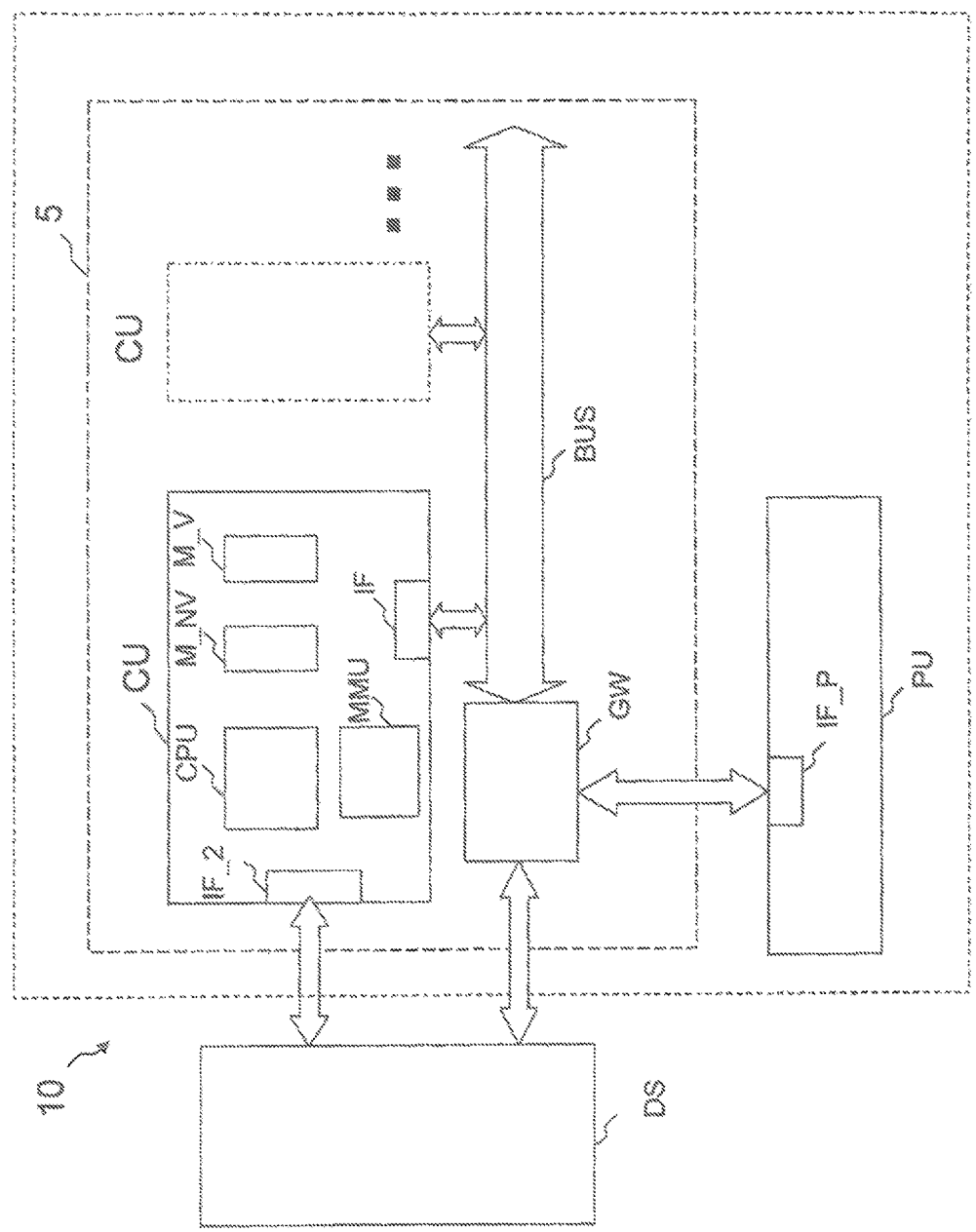

CONTROL UNIT FOR A MOTOR VEHICLE, PROGRAMMING UNIT, AND PROGRAMMING SYSTEM

CROSS REFERENCE TO RELATED APPLICATIONS

This application is a continuation of PCT International Application No. PCT/EP2012/063394, filed Jul. 9, 2012, which claims priority under 35 U.S.C. § 119 from German Patent Application No. 10 2011 079 399.2, filed Jul. 19, 2011, the entire disclosures of which are herein expressly incorporated by reference.

This application contains subject matter related to U.S. application Ser. No. 14/158,432, entitled "CONTROL UNIT FOR A MOTOR VEHICLE, PROGRAMMING UNIT, AND PROGRAMMING SYSTEM," filed on even date herewith.

BACKGROUND AND SUMMARY OF THE INVENTION

The invention relates to a control unit for a motor vehicle, a programming unit and a programming system.

Modern motor vehicles have a plurality of program controlled control units. The control units usually comprise a program memory that can be programmed in an installed state of the control unit. In today's control units the program memory is often designed as a flash memory. Flash memories are non volatile memory components, wherein unwritten or erased cells can be rewritten at any time, but wherein the erasing procedure of the cells is only possible in sectors. The control units frequently have a diagnostic interface, by means of which the control unit can be coupled to a vehicle independent diagnostic and/or test device. When reprogramming the control units, a new version of the control unit software, for example, a firmware program, is always loaded into the control unit by means of the diagnostic and/or test device.

The increasing functionality of the control units and the ever-growing number of different control units will lead to a significant increase in the number of software variants that have to be made available to the motor vehicle or more specifically to the control units.

The object of the present invention is to provide a control unit for a motor vehicle, a programming unit and a programming system, all of which facilitate a flexible and/or reliable programming of the control unit.

This and other objects are achieved, according to a first aspect of the invention, by a control unit that is designed for a motor vehicle and has a central processing unit, wherein the central processing unit is designed to execute one or more control programs. Furthermore, the control unit comprises at least one communication interface for transmitting and receiving data and a program memory for storing the program data of the respective control programs. The control unit is designed to evaluate a program data update request for at least one control program that is to be updated, wherein said program data update request is provided at the communication interface. For this purpose the program data update request includes at least one address of an external data source, which is independent of the control unit and from which the respective current program data of the control program to be updated can be requested. Furthermore, the control unit is designed to output a program data request for the respective current program data to the external data source over the communication interface and/or over a second communication interface. Furthermore, the control unit is designed to read in the program data of the respective control programs, which are present at the communication interface and/or the second communication interface in response to the program data request, and to store said program data in the program memory.

The advantage of this feature is that it facilitates a very flexible programming of the control unit. In this case the term "programming" should be construed in the sense of incorporating one or more control programs in the control unit in such a way that the control unit can execute the respective control program. The program data of the control programs that are necessary for the programming of the respective control units can be provided by various sources. This arrangement makes it possible for a plurality of control units to be programmed very fast simultaneously, because the data do not have to be provided solely by one source and/or by means of one source, for example, a suitably designed programming unit.

In one advantageous embodiment the control unit comprises a memory management unit. The memory management unit is designed to determine a memory area for the program data of the respective control programs that are read in over the communication interface and/or the second communication interface. Furthermore, the memory management unit is designed to store the program data in the determined memory area and to make the program data available to the central processing unit for execution.

The advantage of this feature is that it facilitates a flexible management of the memory units of the control unit. In this case the determining procedure of the memory area and the storing procedure of the program data can also include that the control unit is designed to execute additional steps in preparation and/or post-preparation of storing and/or providing program data, for example an initialization, an indexing and/or a marking of the configuration data. The control unit can control the storage of the program data, as a function of a free memory capacity and/or the memory configuration, for example as a flash memory or a random access memory. The storage of the program data can be performed independently of a memory control function by means of the data source that provides the program data, for example, independently of the programming unit. It is not necessary that the data source and/or the programming unit know the memory configuration of the relevant control unit and/or are suitably designed to determine the memory configuration of the control unit. Owing to the plethora of different control units such a feature can make a significant contribution to cutting the costs, in particular, during maintenance of the control units.

Furthermore, the design of the control unit with a memory management unit has the advantage that, for example, the program data can be modified and/or expanded prior to transmission to the control unit in such a way that the transmission can be executed reliably and/or faster. In the control unit the program data can be converted back into their original format, using the memory management and/or other modules. For example, the program data can be transmitted in encoded form. The control unit can be designed to execute a plurality of control programs virtually in parallel. The control programs can be executed at different run times, at least to some extent, i.e., at different times and for different periods of time, as a function, for example, of a predetermined priority for the respective control program. In this case the memory management can be configured to make the respective program data available to the central processing unit for execution at the run times of the respective control program. The run times can be determined, for example, as a function of the priorities.

In one additional advantageous embodiment the control unit is designed to support a specified set of protocols for the programming of the control unit with the program data that are stored in a specified way in the program memory. The control unit is designed to read in and evaluate an additional program data update request for at least one control program that is to be updated and that is provided at the communication interface. In this case the additional program data update request includes at least a first indicator that represents the possible protocols that can be used for the programming with the updated program data of the respective control program. Furthermore, the control unit is designed, depending on the first indicator in each case, to determine a second indicator that represents the protocol from the set of protocols that is to be used for the programming of the control unit with the program data of the control program that is to be updated. The control unit is designed to send an additional program data request, which includes the second indicator, over the communication interface in response to the additional program data update request.

One possible protocol that can be used for the programming of the control unit is the unified diagnostic services protocol (UDS protocol). The UDS protocol is a communication protocol that was developed for motor vehicles and that facilitates communication between the respective control unit and a unit that is located outside the vehicle. For this purpose the respective motor vehicle may have a diagnostic interface, which allows the unit to be coupled to a data bus of the vehicle. With this arrangement it is possible, for example, to query a fault memory of the respective control unit and/or to load one or more control programs, in particular, a current firmware into the program memory. The UDS protocol can be used for simpler control units, which have, for example, a microcontroller and/or are designed as an embedded system.

With the increasing functionality and complexity of the control units, which have, for example, one or more processors and/or have a different program memory structure, it may be necessary to use other protocols for the programming of the control unit, in order to make reliable programming possible. One instruction of the protocol by means of the control unit makes it possible that the protocol can be suitably selected as a function of a given hardware and software platform of the control unit, so that a reliable, flexible and/or fast programming of the control unit is possible. At the same time the control unit can be designed to receive the program data directly from a suitably designed programming unit, which is coupled to the control unit over the communication interface, and/or to download or request said program data from an external data source by using an address for establishing a connection between the control unit and the external data source. The program data update request and the additional program data update request can also be combined together into one request. Even the program data request and the additional program data request can be combined together into one request.

In an additional advantageous embodiment the control unit is designed to detect the program data, which are compressed in a defined manner and which are read in over the communication interface and/or the second communication interface, as such and to decompress said compressed program data. This feature has the advantage that the period of time that it takes to transmit the program data to the control unit can be shortened. The compression has the advantage that the amount of data to be transmitted for the program data is much smaller. This feature can help to reduce the probability of an error during the transmission.

In another advantageous embodiment the control unit is designed to detect a container file, which is composed of one or more data files with program data and which is read in over the communication interface and/or the second communication interface, as such and to extract the data files from the container file. This arrangement allows that the data can be transmitted in compressed form. As an alternative or in addition, the container file can be encrypted and/or can be transmitted in such a way that said container file is protected by means of a password.

According to a second aspect of the invention, a programming unit is provided for at least one control unit of a motor vehicle. The programming unit has an additional communication interface, by means of which the programming unit can be coupled to the respective control unit. The programming unit is designed to query a program version of at least one control program of the respective control unit, to which it is coupled; and, when said programming unit detects that said at least one control program is not stored in a specified program version in the control unit, the programming unit is designed to send a program data update request to the respective control unit over the additional communication interface. For this purpose the program data update request includes at least one address of an external data source, which is independent of the control unit and from which the respective current program data of the control program to be updated can be requested.

In this case the programming unit can be designed to query the program version directly from the control unit and/or to request a transmission of the content of a specified memory area directly from the control unit.

In one advantageous embodiment the programming unit is designed to send an additional program data update request for at least the one control program, which is to be updated, to the respective control unit over the additional communication interface, when the programming unit detects that the at least one control program is not stored in a specified program version in the control unit. For this purpose the additional program data update request includes at least a first indicator that represents the possible protocols that can be used for the programming with the updated program data of the respective control program. Furthermore, the programming unit is designed to evaluate an additional program data request, which is provided at the additional communication interface in response to the additional program data update request. In this case the additional program data request includes a second indicator, which represents a protocol selected by the respective control unit. Furthermore, the programming unit is designed to provide indirectly and/or directly, depending on the evaluation results, the programming with the current program data according to the protocol that is currently selected.

When the program data are provided directly, the program data are provided by the programming unit and are sent to the control unit. When the program data are provided indirectly, the programming unit informs the control unit of an address of a data source, from which the control unit can request and/or download the program data.

In an additional advantageous embodiment the programming unit is designed to compress the program data in a defined manner and to send the compressed data to the respective control unit over the additional communication interface. The compression has the advantage that the amount of data to be transmitted for the program data is significantly smaller. This feature may help to decrease the probability of an error during transmission and to reduce the transmission time.

In another advantageous embodiment the programming unit is designed to combine one or more data files, each of which is composed of program data, together into one container file and to send the one container file over the additional communication interface to the respective control unit. This feature allows that the data can be transmitted to the respective control units in compressed form. As an alternative or in addition, the container file can be transmitted encrypted and/or can be transmitted password-protected.

According to a third aspect of the invention, a programming system is provided which includes at least one control unit according to the first aspect, and a programming unit according to the second aspect, wherein the programming unit is coupled to the respective control unit. In this case advantageous embodiments of the first and second aspects also apply to the third aspect.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a first exemplary embodiment of a programming system according to the invention.

DETAILED DESCRIPTION OF THE DRAWING

The programming system 10, depicted in FIG. 1, includes a system 5, which is located inside the vehicle, and a programming unit PU, which is located outside the vehicle. The system 5, which is located inside the vehicle, includes one or more control units CU and, for example, one or more vehicle data buses as well as a gateway GW. The gateway GW couples, for example, a plurality of vehicle data buses BUS; and/or the gateway GW enables communication to the communication units that are located outside the vehicle by use of, for example, a wireless network connection. As an alternative, it is possible for the system 5 that is located inside the vehicle to include a plurality of gateways GW.

The respective control unit CU includes a communication interface IF. Data can be sent as well as received by the control unit CU over the communication interface IF. The communication interface IF couples the control unit CU to, for example, the vehicle data bus BUS of the motor vehicle. The vehicle data bus is designed, for example, as a controller area network bus (CAN bus). In principle, however, other vehicle data buses known to the person skilled in the art may be used.

The programming unit PU can be arranged, for example, in a test and diagnostic device. The programming unit can be used, for example, in vehicle production and/or in a vehicle repair shop for the programming of at least a portion of the control unit CU of the respective motor vehicles. The programming unit PU has, for example, an additional communication interface IF_P, by means of which the programming unit PU can be coupled to the respective control unit CU and/or the vehicle data bus BUS. The data can be sent and received by the programming unit PU over the additional communication interface IF_P. For example, the programming unit PU can communicate with the respective control unit CU with the assistance of the gateway GW.

The control unit CU includes a central processing unit CPU. The central processing unit CPU can have, for example, a microcontroller and/or a microprocessor. The central processing unit CPU is designed to execute programs and calculations for open loop and/or closed loop control of other vehicle systems, such as for an engine control function, an engine emission control function and/or an electronic stability control function (ESP, electronic stability program).

Furthermore, the control unit CU includes a program memory M_NV. The central processing unit CPU is coupled to the program memory M_NV. The program data of the respective control programs, which are executed by the central processing unit CPU, are stored in the program memory M_NV. The program memory M_NV is designed, for example, as a non volatile memory, for example, as a flash memory. The program memory M_NV is designed so as to be, for example, reprogrammable in the sense that a control program, which was previously stored in the program memory M_NV, can be at least partially erased at first; and then the resulting free memory area can be rewritten with the program data of a more recent control program or another control program. The reprogramming of, for example, the flash memory enables the elimination of errors and the addition of new functions for the control unit CU. The program memory M_NV can also include a fault memory. For example, malfunctions of the motor vehicle that are detected by the control unit CU and/or the detected technical defects can be stored in the fault memory.

The control unit CU can have, for example, a volatile memory unit M_V, which is designed, for example, as a random access memory (RAM memory).

The program memory M_NV and/or the volatile memory unit M_V can be arranged in the microcontroller or more specifically in the microprocessor. In principle, the program memory M_NV and/or the volatile memory unit M_V can also be arranged as external components outside the microcontroller or more specifically the microprocessor in the control unit CU.

The control unit CU is designed to evaluate a program data update request, which is provided at the communication interface IF, for at least one control program that is to be updated. At the same time the program data update request includes at least one address of an external data source DS, which is independent of the control unit CU and from which the respective current program data of the control program to be updated can be requested. Furthermore, the control unit CU is designed to output a program data request for the respective current program data to the external data source DS over the communication interface IF and/or over a second communication interface IF_2. Furthermore, the control unit CU is designed to read in the program data of the respective control programs that are present at the communication interface IF and/or the second communication interface IF_2 in response to the program data request and to store said program data in the program memory M_NV.

Working on the aforesaid, the control programs that are necessary for the programming of the respective control units CU can be provided by various sources. The program data can be provided, for example, by the programming unit PU; and the control unit CU can be designed to request the program data from the programming unit PU. The address can have, for example, a source indicator (uniform resource locator, URL). For example, the second communication interface IF_2 can comprise an air interface, so that the control unit CU can download the program data directly from the data source DS. As an alternative or in addition, the control unit CU can be designed to download the program data over the communication interface and the gateway GW. As an alternative or in addition, the address can include an identifier, for example, an identification number or a number. In this case the control unit CU can request the program data from the data source DS over the communication interface IF, the second communication interface IF_2 and/or by way of the gateway GW; and then said data source transmits the program data to the control unit CU. The data source DS can be designed, for example, as a server.

For the transmission of the program data, it is possible to use, for example, a server template. For the transmission of the program data, it is possible to use, for example, an application protocol that is based on the Internet protocol (IP). Examples of such an application protocol are the hypertext transfer protocol (http), the hypertext transfer protocol secure (https), the file transfer protocol (ftp) and rsync.

The programming unit PU is designed so as to correspond to the control unit CU, so that the programming unit PU can query a program version of at least one control program of the respective control unit CU, to which the programming unit is coupled; and if the programming unit detects that the at least one control program is not stored in a specified program version in the control unit CU, the programming unit is designed to send the program data update request to the respective control unit CU over the additional communication interface IF_P. For this purpose the program data update request includes the at least one address of the external data source DS, which is independent of the control unit CU and from which the current program data of the control program that is to be updated can be requested.

Furthermore, the control unit CU can have a memory management unit MMU. The memory management unit MMU is designed, for example, to determine a memory area for the program data of the respective control programs, which are read in over the communication interface IF and/or the second communication interface IF_2. Furthermore, the memory management unit MMU is designed, for example, to store the program data in the determined memory area and to make the program data available to the central processing unit CPU for execution.

This arrangement facilitates a flexible management of the program memory M_NV of the respective control unit CU, for example, independently of a specified memory program of the external data source DS. The control unit CU can manage, for example, the program memory M_NV independently of a flash loader program. In the event that the external data source DS specifies the memory management, such a flash loader program can be sent, for example, from the external data source DS to the control unit CU. The flash loader program has a memory command sequence, so that in one embodiment of the flash loader program the program data to be stored are stored in the program memory M_NV in a specified way. In this case the storage of the program data is specified by the external data source DS, which may also be the programming unit PU.

The control unit CU can be designed to detect the program data, which are compressed in a specified way and which are read in over the communication interface IF and/or the second communication interface IF_2, as such and to decompress the compressed program data. For the data compression, a Huffman coding may be used, for example. As an alternative, additional compression methods known to the person skilled in the art can be used.

Furthermore, the control unit CU can be designed to detect a container file, which is composed of one or more data files with program data and which is read in over the communication interface IF and/or the second communication interface IF_2, as such and to extract the data files from the container file. The container file can be designed, for example, as a compressed archive file. The container file can have, for example, a ZIP file format or a GZIP file format or a TAR file format.

The compressed program data and/or the container file can be provided, for example, by the programming unit PU and/or by the external data source DS.

Furthermore, the control unit CU can also be designed in such a way that a specified set of protocols supports the programming of the control unit CU with the program data that are stored in the program memory. Furthermore, the control unit CU can be designed to read in and evaluate an additional program data update request for at least one control program that is to be updated and that is provided at the communication interface IF. In this case the additional program data update request comprises at least a first indicator, which represents the possible protocols that can be used for the programming with the updated program data of the respective control program. Furthermore, the control unit CU is designed, depending on the first indicator in each case, to determine a second indicator that represents the protocol from the set of protocols that is to be used for the programming of the control unit CU with the program data of the control program to be updated. The control unit CU is designed to send over the communication interface IF an additional program data request, which comprises the second indicator, in response to the additional program data update request.

In this context the programming unit PU is designed, for example, to send the additional program data update request for at least the one control program, which is to be updated, to the respective control unit CU over the additional communication interface IF_P, if the programming unit detects that the at least one control program is not stored in the specified program version in the control unit CU. For this purpose the additional program data update request comprises at least the first indicator, which represents the possible protocols that can be used for the programming with the updated program data of the respective control program. Furthermore, the programming unit PU is designed to evaluate the additional program data request, provided at the additional communication interface IF_P in response to the additional program data update request, wherein the additional program data request comprises the second indicator, which represents the protocol selected by the respective control unit CU. Furthermore, the programming unit is designed to provide indirectly and/or directly, depending on the evaluation results, the programming with the current program data according to the protocol that is currently selected.

Possible protocols are, for example, the UDS protocol and the hyper text transfer protocol (http).

For this purpose it can be provided then that the control unit CU and the programming unit PU communicate initially over a first protocol, for example, the unified diagnostic services protocol (UDS protocol) during a preparation phase. For example, it can be provided that the UDS protocol is expanded to include a service for querying a desired protocol for the exchange of data between the control unit CU and the programming unit PU, in particular for the programming of the control unit CU. For example, it can be provided that such a query is performed individually for each control program that is to be updated. As an alternative, it is possible that such a query is made for a plurality of control programs that are to be updated. The first and second indicator can have in each instance a specified code that makes it possible to determine the potential protocol or more specifically the desired protocol.

The programming unit PU preferably supports the protocols that are possible for the programming of the control unit CU. In this case the term "support" is to be understood in the sense that the programming unit PU is designed to provide indirectly and/or directly the programming with the current program data according to the protocol that is currently selected.

The programming unit PU is designed, for example, in such a way that, if it can execute by itself the programming of the control unit CU according to the desired protocol, then it provides directly the programming of the respective control unit CU with the current program data according to the protocol that is currently selected, for example, by sending the program data directly to the control unit CU. The programming unit PU can be designed to send the program data update request to the control unit CU in response to the additional program data request of the control unit CU, when the programming unit cannot execute the programming with the desired protocol. In this case the control unit comprises an address of the external data source DS, from which the current program data according to the desired protocol can be requested by the control unit CU. In this case the programming unit PU provides indirectly the programming with the current program data according to the protocol currently selected. As an alternative or in addition, the programming unit PU can be designed, independently of whether it can or cannot execute the programming with the desired protocol, to send the program data update request to the control unit CU in response to the additional program data request of the control unit CU.

Optionally it can be provided that the programming unit PU can ignore, if desired, the protocol selected by the control unit CU and can use a different protocol that the control unit CU supports just as well.

LIST OF REFERENCE NUMERALS:

5 system located inside the vehicle
10 programming system
BUS vehicle data bus
CPU central processing unit
CU control unit
DS external data source
GW gateway
IF communication interface
IF_2 second communication interface
IF_P additional communication interface of the programming unit
M_NV program memory
M_V volatile memory unit
MMU memory management unit
PU programming unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control unit arranged in a motor vehicle, said control unit comprising:
at least one central processing unit, which is operatively configured to execute one or more control programs necessary to program the control unit to control systems of the motor vehicle;
a communication interface operatively configured to transmit data to and receive data from a programming unit, which is external to the vehicle and is configured to program motor vehicle control units;
at least one program memory for storing program data of the respective control programs, wherein the program data comprises executable program code of the respective control program;
wherein the control unit is operatively configured to:
evaluate a program data update request, received at the communication interface from the programming unit, for a control program, of the one or more control programs, that is to be updated, wherein the program data update request includes an address of an external data source, which is independent of the programming unit and of the control unit and from which respective current executable program code of the control program to be updated can be requested;
output, in response to the received program data update request and using the address, a program data request for the respective current executable program code to the external data source over the communication interface and/or over a second communication interface;
read-in the respective current executable program code of the control program to be updated when provided by the external data source at the communication interface and/or the second communication interface in response to the program data request;
read-in the respective current executable program code of the control program to be updated when provided directly by the programming unit at the communication interface; and
store the read-in executable program code of the control program to be updated in the program memory.

2. The control unit according to claim 1, wherein said control unit comprises a memory management unit, which is operatively configured to:
determine a memory area for the read-in executable program code;
store the read-in executable program code in the determined memory area; and
make the read-in executable program code available to the central processing unit for execution.

3. The control unit according to claim 1, wherein said control unit is operatively configured to:
support a specified set of protocols for programming of the control unit with the read-in executable program code that is stored in a specified way in the program memory;
read-in and evaluate an additional program data update request for the control program that is to be updated and that is provided at the communication interface, wherein the additional program data update request comprises at least a first indicator that represents the possible protocols usable for the programming with the read-in executable program code of the control program to be updated;
determine, depending on the first indicator in each case, a second indicator that represents the protocol from the set of protocols that is to be used for the programming of the control unit with the read-in executable program code; and send an additional program data request, which comprises the second indicator, over the communication interface in response to the additional program data update request.

4. The control unit according to claim 3, wherein said control unit is operatively configured to detect the read-in executable program code, which is compressed in a defined manner and which are read-in over the communication interface and/or the second communication interface, as such and to decompress the compressed read-in executable program code.

5. The control unit according to claim 3, wherein said control unit is operatively configured to detect a container file, which is composed of one or more data files with executable program code of the one or more control programs and which is read-in over the communication interface and/or the second communication interface, as such and to extract the data files from the container file.

6. The control unit according to claim 1, wherein said control unit is operatively configured to detect the read-in executable program code, which is compressed in a defined manner and which are read-in over the communication interface and/or the second communication interface, as such and to decompress the compressed read-in executable program code.

7. The control unit according to claim 1, wherein said control unit is operatively configured to detect a container file, which is composed of one or more data files with executable program code of the one or more control programs and which is read-in over the communication interface and/or the second communication interface, as such and to extract the data files from the container file.

8. A programming unit arranged externally from a motor vehicle for a control unit of the motor vehicle, said programming unit comprising:
a communication interface, by which the programming unit is coupleable to the control unit,
wherein said programming unit is operatively configured to:
query a program version of at least one control program of the control unit, to which it is coupled;
send a program data update request to the control unit over the communication interface when said programming unit detects that said at least one control program is not stored in a specified program version in the control unit; and
send current executable program code for the at least one control program to the control unit, wherein the executable program code is necessary to program the control unit to control systems of the motor vehicle,
wherein the program data update request includes an address of an external data source, which is independent of the programming unit and the control unit and from which the current executable program code of the at least one control program can be requested.

9. The programming unit according to claim 8, wherein said programming unit is operatively configured to:
send an additional program data update request for the control program, which is to be updated, to the control unit over the communication interface, when said programming unit detects that said control program is not stored in a specified program version in the control unit, wherein the additional program data update request comprises at least a first indicator that represents the possible protocols usable for the programming with the current executable program code of the respective control program;
evaluate an additional program data request, which is made available at the communication interface in response to the additional program data update request, wherein the additional program data request comprises a second indicator, which represents a protocol selected by the control unit; and
provide, depending on results of the evaluation, the programming unit with the current executable program code according to the protocol that is currently selected.

10. The programming unit, according to claim 9, wherein said programming unit is operatively configured to compress the current executable program code in a defined manner and to send said compressed current executable program code to the respective control unit over the communication interface.

11. The programming unit according to claim 9, wherein said programming unit is operatively configured to combine one or more data files, each of which is composed of executable program code of control programs, together into one container file and to send said one container file over the communication interface to the respective control unit.

12. The programming unit according to claim 8, wherein said programming unit is operatively configured to compress the current executable program code in a defined manner and to send said compressed current executable program code to the respective control unit over the communication interface.

13. The programming unit according to claim 8, wherein said programming unit is operatively configured to combine one or more data files, each of which is composed of executable program code of control programs, together into one container file and to send said one container file over the communication interface to the respective control unit.

14. The programming unit of claim 8, wherein the external data source is one of a plurality of available external data sources from which the current executable program code of the control program can be updated, and which is accessed by the control unit using the address.

15. A programming system, comprising:
a control unit arranged in a motor vehicle, said control unit comprising:
at least one central processing unit, which is operatively configured to execute one or more control programs;
a communication interface operatively configured to transmit data to and receive data from a programming unit, which is external to the motor vehicle and is configured to program motor vehicle control units;
at least one program memory for storing the program data of the respective one or more control programs, the program data comprising executable program code of the respective one or more control programs,
wherein the control unit is operatively configured to:
evaluate a program data update request, received at the communication interface, for a control program, of the one or more control programs, that is to be updated, wherein said program data update request includes an address of an external data source, which is independent of the programming unit and of the control unit and from which current executable program code of the control program to be updated can be requested;

output, in response to the received program data update request and using the address, a program data request for the current executable program code to the external data source over the communication interface; and read in the current executable program code of the control program to be updated when provided by the external data source at the communication interface and/or a second communication interface in response to the program data request;

read in the respective current executable program code of the control program to be updated when provided by the external data source directly by the programming unit at the communication interface; and store said read-in executable program code of the control program to be updated in the program memory; and the programming unit coupled to the control unit, said programming unit comprising:

the communication interface, by which the programming unit is coupleable to the control unit, wherein said programming unit is operatively configured to:

query a program version of the control program of the control unit, to which it is coupled;

send the program data update request to the control unit over the communication interface when said programming unit detects that said at least one control program is not stored in a specified program version in the control unit; and send the respective current executable program code of the control to be updated to the control unit.

16. The programming system of claim 15, wherein the external data source is one of a plurality of available external data sources from which the current executable program code of the control program can be updated, and which is accessible by the control unit using the address.

* * * * *